Oct. 11, 1966  J. J. PASTORIZA  3,278,736
EDUCATIONAL APPARATUS
Filed Nov. 13, 1962  4 Sheets-Sheet 1
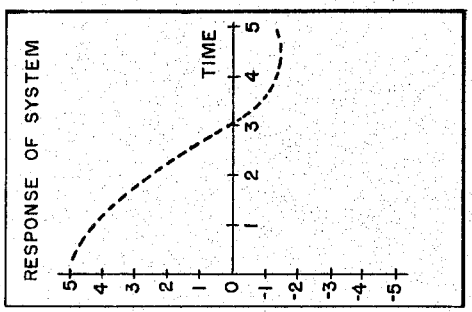
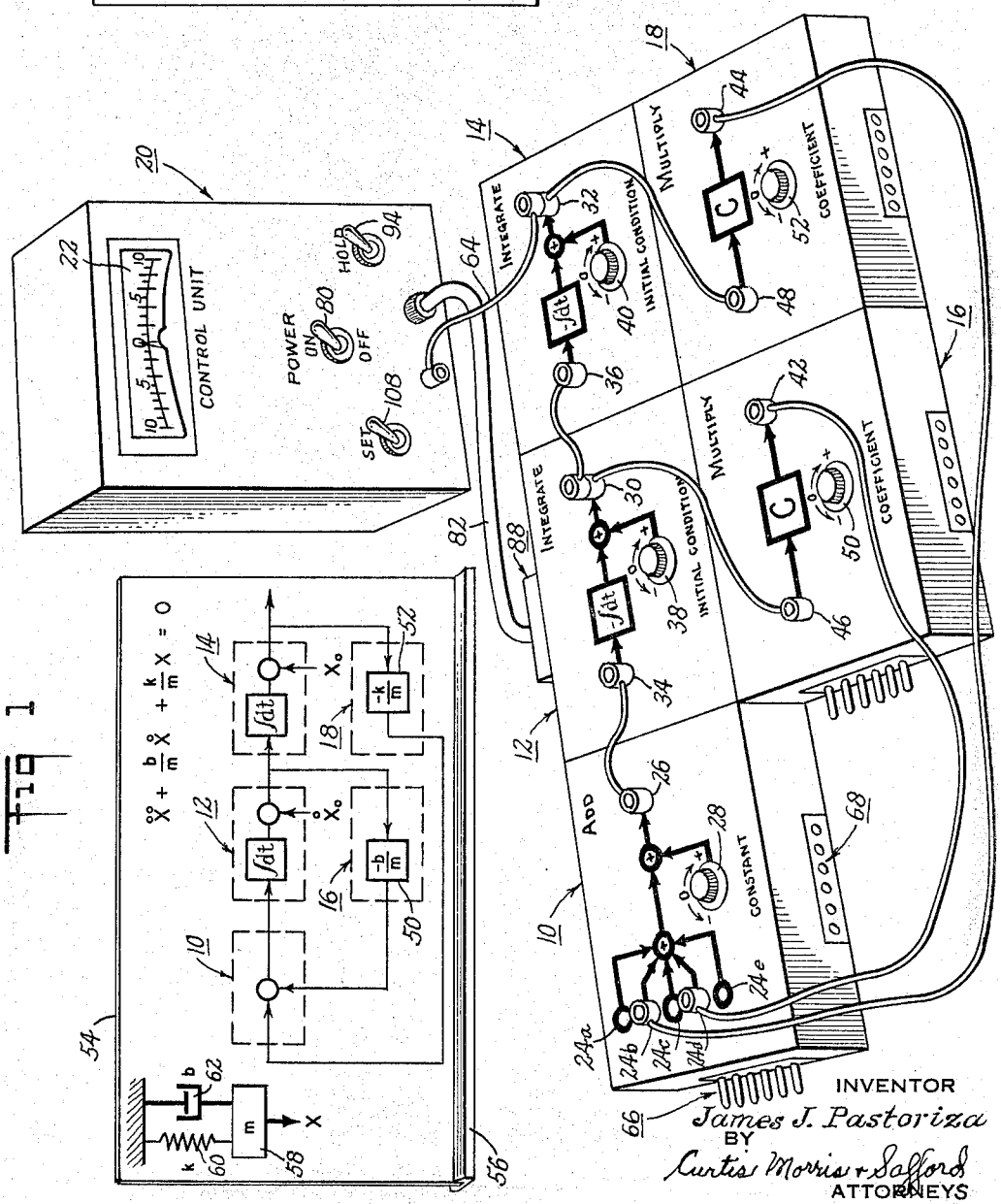
INVENTOR
James J. Pastoriza
BY
Curtis, Morris & Safford
ATTORNEYS

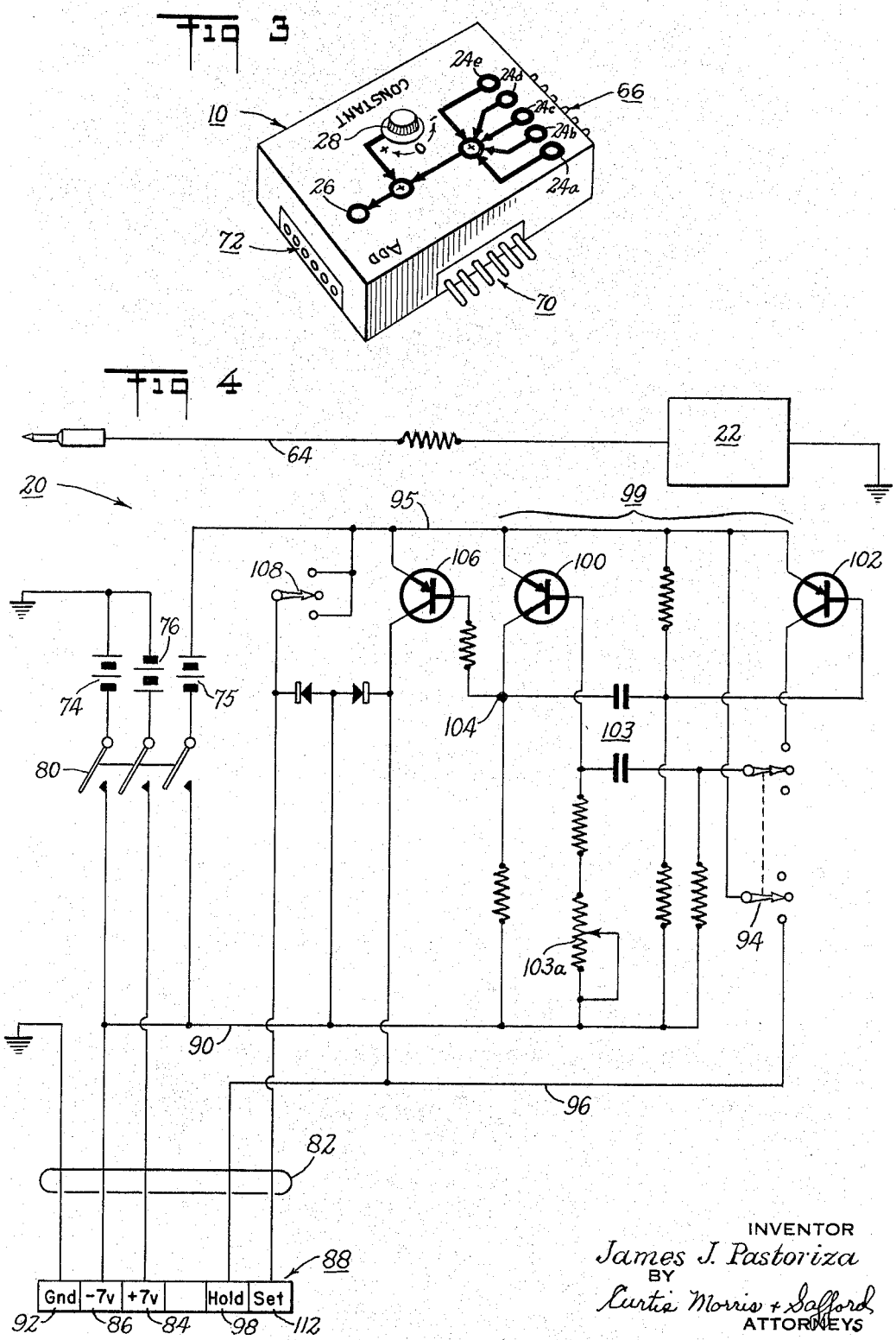

Oct. 11, 1966 J. J. PASTORIZA 3,278,736
EDUCATIONAL APPARATUS
Filed Nov. 13, 1962 4 Sheets-Sheet 3

INVENTOR
James J. Pastoriza
BY
Curtis Morris & Safford
ATTORNEYS

Oct. 11, 1966   J. J. PASTORIZA   3,278,736
EDUCATIONAL APPARATUS
Filed Nov. 13, 1962   4 Sheets-Sheet 4
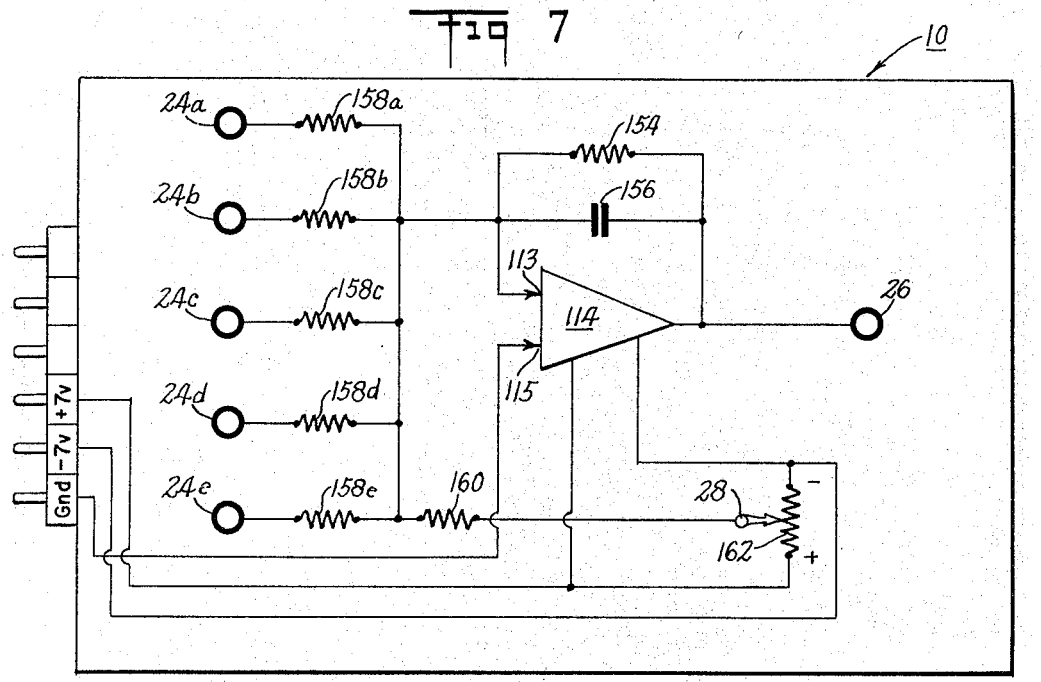
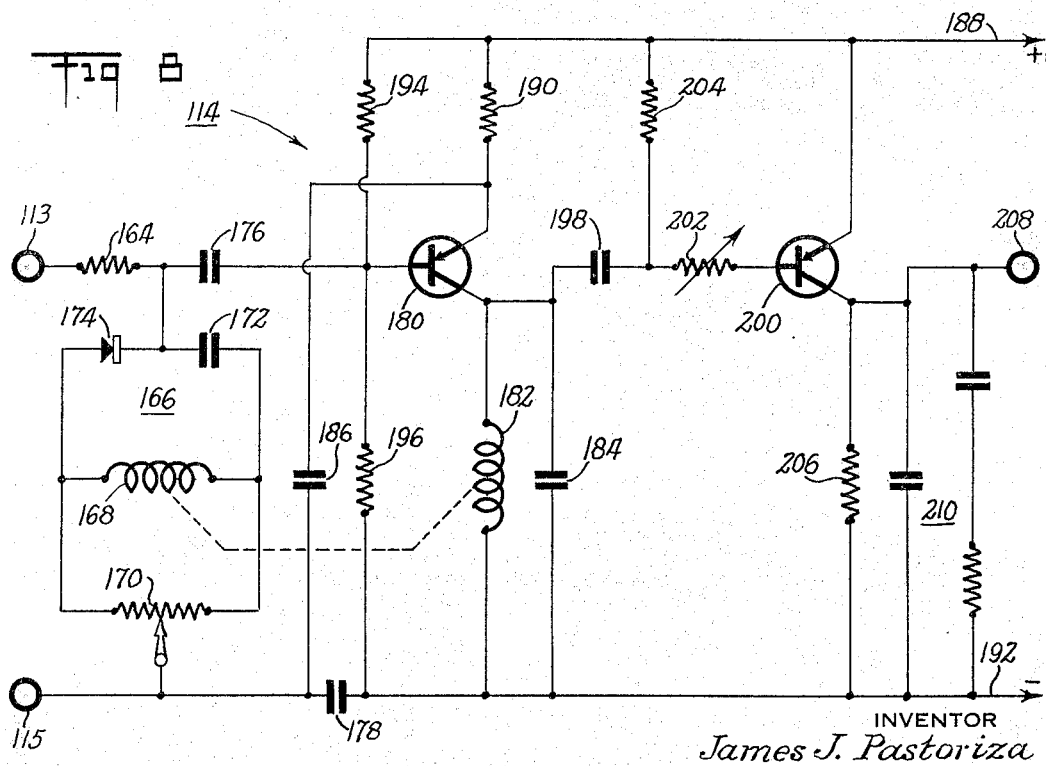
INVENTOR
James J. Pastoriza
BY
Curtis Morris + Safford
ATTORNEYS cially inexpensive to construct that it is economically feasible for each student to be provided with his own personal set of teaching units, so that he may work out problems at any time. Other objects, aspects and advantages of this invention will in part be pointed out in, and in part apparent from, the following description of a preferred embodiment, considered together with the accompanying drawings, in which:

FIGURE 1 is a perspective view of a group of teaching units in accordance with the present invention, set up to simulate a specific relationship;

FIGURE 2 shows the development of a chart to demonstrate the dynamic changes in the measured variable of the system being simulated in FIGURE 1;

FIGURE 3 is a perspective view of the reverse sides of one of the units of FIGURE 1;

FIGURE 4 is a schematic diagram of the control unit;

FIGURES 5, 6 and 7 are schematic diagrams of the integrator, coefficient multiplier and adder units, respectively; and FIGURE 8 is a schematic diagram of the amplifier used with the units shown in FIGURES 5, 6 and 7.

Figure 5:
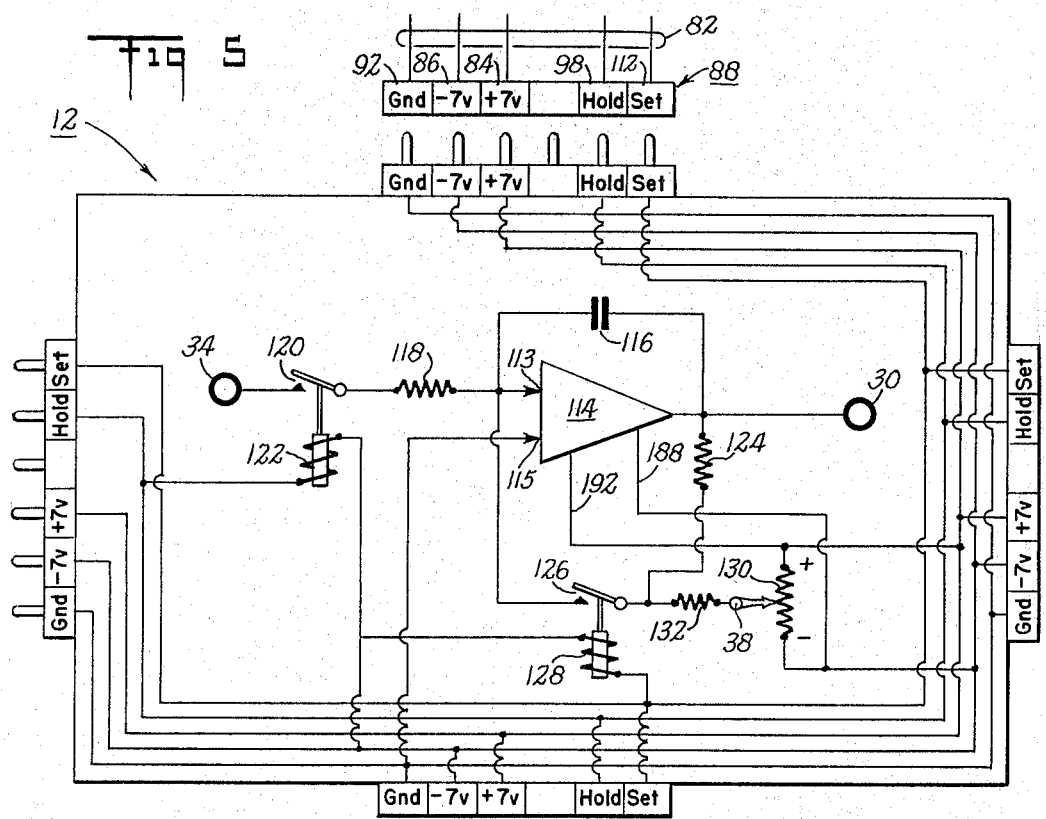

Referring first to FIGURE 1, there is shown a group of five teaching units 10, 12, 14, 16 and 18 operated by a control unit 20 including a meter 22. Each of the teaching units is electrically-operated, and is adapted to receive an electrical input signal and to produce a corresponding electrical output signal which is related to the input signal in accordance with a specific predetermined mathematical relationship.

In more detail, the first unit 10 serves to add several input signals, applied to any of five input terminals 24a–24e, and to produce on its output terminal 26 a signal which is proportional to the sum of the added inputs. Adder unit 10 also includes provision for adding to the output signal an internally-developed signal representing a mathematical "constant," the magnitude and sign (i.e., whether plus or minus) of which are controllable by a manually-adjustable knob 28.

To the right of adder unit 10 are two identical integrator units 12 and 14. These units produce on respective output terminals 30 and 32 electrical signals representing by their magnitude the time-integral of signals applied to the respective input terminals 34 and 36. Each unit also includes a manually-adjustable knob 38 and 40 to set the "initial condition" at the start of integration.

Immediately below the integrator units are two identical coefficient multiplier units 16 and 18 which produce on respective output terminals 42 and 44 electrical signals proportional in magnitude to the corresponding signals applied to their input terminals 46 and 48. Each multiplier unit includes a manually-adjustable knob 50 and 52 to control the proportionality between input and output, i.e., the magnitude of the mathematical "coefficient" by which the input signal is multiplied.

Above the teaching units 10–18 in FIGURE 1 is depicted an instruction sheet 54, adapted to be mounted on a simple stand 56 or the like, and carrying in its upper left-hand corner a diagrammatic representation of a mechanical system which the teaching units are arranged to simulate. This mechanical system comprises a weight 58 of mass "$m$" suspended by a spring 60 having a spring-constant "$k$" and a dashpot 62 having a characteristic "$b$." The weight may be deflected up or down from its rest position, and, as is well known, when released will oscillate about its rest position with a predetermined period and ever-decreasing amplitude due to the damping effect of the dashpot.

To the right of the mechanical diagram on the sheet 54 is a mathematical equation relating the various elements of the system, the term "$x$" desginating the vertical displacement of the weight 58. In words, this equation establishes that the second derivative with respect to time of $x$ (i.e., the acceleration, designated $\ddot{x}$) plus $b/m$ times the first derivative of $x$ (i.e., the velocity, designated $\dot{x}$) plus $k/m$ times the displacement $x$ equals zero. Of course, if an external force also were applied to the weight, the sum of these three factors would be proportional to such force. To simplify the presentation herein, however, it will be assumed that no external force is applied to the weight during the period of interest. Thus, the equation may be rewritten, for purposes which will be apparent below, as $\ddot{x} = -(b/m)\dot{x} - (k/m)x$.

Beneath the equation discussed above is shown, on sheet 54 a block diagram representation of the mathematical functions required to simulate the mechanical system described. In this block diagram, the individual boxes have been numbered 10, 12, etc., to indicate the corresponding teaching units used to perform the required mathematical functions. If, now, we apply to the input of the first integrator unit 12 a signal the magnitude of which corresponds to the second time-derivative of the $x$ (the source of this signal will be made clear subsequently), the output of this integrator will equal the velocity ($\dot{x}$) of the weight, plus whatever initial velocity ($\dot{x}_0$) the weight had at the start of integration. To simplify matters, let it be assumed that the weight was initially at rest, so that $\dot{x}_0$ is zero.

The output (i.e., velocity) of the first integrator unit 12 is connected to the input of the second integrator unit 14, so that the output of the latter will be equal to the change in displacement ($x$) of the weight 58 over the integration period, plus the initial displacement of the weight at the start of operations; in other words, the output of this integrator will correspond to actual displacement, or position, of the weight of any given time. It will be assumed that the weight is initially displaced 5 units of distance, so that the action of spring 60 will urge the weight back towards its rest position.

The output signal of the second integrator unit 14 (representing position) is connected to the input of coefficient multiplier unit 18, the manually-adjustable knob 52 of which is set to give a multiplication factor equal to $(-k/m)$. Thus the output of this unit corresponds to $(-k/m)$ times $x$. Similarly, the output of the first integrator unit 12 (representing velocity) is connected to the input of the other coefficient multiplier 16, the knob 50 of which is set to give a multiplication factor of $(-b/m)$. Thus the output of this unit corresponds to $(-b/m)$ times $x$.

The outputs of the two multipliers 16 and 18 are fed to respective input terminals of the adder unit 10, so that the output terminal of this unit produces a signal corresponding to $(-b/m)\dot{x}$ plus $(-k/m)x$. As noted hereinabove, the sum of these two components is equal to $\ddot{x}$ (the second derivative of $x$), and therefore the output of adder unit 10 is connected directly to the input of the first integrator unit 12. By thus completing the loop, the various teaching units are interconnected in a manner to simulate the mathematical equation of the mechanical vibrating system.

If the teaching units now are activated (as will be explained), and the meter 22 is connected by a probe lead 64 to the output terminal 32 of the second integrator unit 14, the meter reading will represent the positioning of the weight 58 as a function of time. Assuming that the initial position ($x_0$) has been set at 5 units, the subsequent meter readings will follow a damped oscillatory curve as plotted in FIGURE 2. This curve represents the solution to the mathematical equation, and quickly demonstrates to the student the nature of the dynamic relationships involved. Quite evidently, also, the student can readily determine the effects of changing certain system parameters, such as the spring constant, merely by adjusting the appropriate teaching unit to simulate the new condition, and then rerunning the problem.

Turning now to the specific construction of the teaching units, each is identically provided with mating plug and receptacle connector means consisting of two male connectors and two female connectors. Referring, for example, to the adder unit 10, one six-prong male connector 66 is at the input (left) side of the unit, and one six-sleeve female connector 68 is at the front of the unit; referring also to FIGURE 3, the second male connector 70 is at the back of the unit, and the second female connector 72 is at the output side of the unit. Each connector includes six side-by-side gold-plated conductive elements for making contact, and corresponding elements of all the connectors of any one unit are connected together electrically within that one unit. Thus, connection to a unit can be made interchangeably through any one of its four connectors. With this arrangement, the teaching units can be connected together, both structurally and electrically, in any desired geometric pattern to suit the character of the mathematical equation being simulated.

The input and output terminals of all of the teaching units consist of small electrically-conductive receptacles adapted to receive miniature banana plugs on the ends of lead wires. Thus any terminal can quickly be connected by the student selectively to any other terminal. The banana plugs on the lead wires also are provided at their upper ends with an additional receptacle to permit making more than one connection to the same terminal, e.g., to receive the banana plug on the end of the probe lead 64 for the meter 22 so that the signal level at any terminal can be observed on the meter display.

Referring now to FIGURE 4, the control unit 20 includes three batteries 74, 75 and 76 which supplies power to the various circuits in the control unit and in all of the teaching units 10–18. An "on-off" switch 80 is operable from the front panel of the control unit to connect these batteries to the respective circuits. When this switch is closed, the two batteries 74 and 76 furnish negative and positive voltage (e.g., 7 volts each with respect to the common ground) through a cable 82 to elements 84 and 86 of a female connector 88 which is arranged to mate with any of the male connectors at the teaching units. In addition, battery 75 (14 volts) is connected through lead 90 to the negative terminal a battery 74, and supplies power to components of the control unit 20 as well as to certain relays in the integrator units 12 and 14.

A three-position "hold" switch 94 is provided at unit 20 for controlling the activation of the integrator units 12 and 14. In the center position of this switch, lead 96 extending to element 98 of connector 88 is conductively isolated from the remainder of the circuitry, and in this condition the integrator units will "hold" their electrical state without change, i.e., there will be no integrating action. If switch 94 is moved down, positive lead 95 (7 volts) is connected to lead 96 to actuate a corresponding relay in each of the integrator units and thereby start integration.

When the hold switch 94 is shifted to its upper position, a timing multivibrator generally indicated at 99 is energized. This multivibrator includes a pair of transistors 100 and 102 which are interconnected with conventional resistor-capacitor coupling networks generally indicated at 103, including a variable resistor 103a for adjusting the frequency of operation; the multivibrator serves to produce at circuit point 104 a series of periodic square-wave signals which are directed to the base of a buffer transistor 106 connected between leads 95 and 96. Accordingly, lead 96 is periodically energized so as to activate integrator units 12 and 14 (as will be explained) for the duration of each square-wave signal, the integrators being inactive between the energizing signals.

In the preferred embodiment described herein, the energizing square-wave signals applied to lead 96 have a duration of 0.25 second and occur about once every second. With this arrangement, the student may easily determine the extent of change that occurs in the measured variable over a given time duration without the need for auxiliary equipment. For example, if the student wishes to know how great a change occurs in one second, he will merely shift the switch 94 to its upper position, allow the meter 22 to make four steps from its initial setting, return the switch to center position, and read the new setting of the meter.

The control unit 20 also includes a three position "set" switch 108 which is shiftable either up or down to connect the positive lead 95 through cable 82 to element 112 of the connector 88. As will be explained, this actuates a corresponding relay in each integrator unit to complete respective circuits making it possible to set any desired initial conditions in the outputs of the integrators.

Referring now to FIGURE 5, the integrator units 12 and 14 comprise a high-gain differential amplifier 114 (the details of which are shown in FIGURE 8) having a negative feedback circuit consisting of a capacitor 116 (1 microfarad) connected between the output and the upper input point 113 of the amplifier. This input point also is connected through a large resistor 118 (1 megohm) and contacts 120 of a "hold" relay 122 to the integrator input terminal 34, and the lower input point 115 is grounded. When the hold relay is actuated to close contacts 120, the signal on the input terminal produces a flow of current through resistor 118 to tend to produce a corresponding change in the amplifier output voltage. Capacitor 116 thereupon receives a charging current and, because the negative feedback action tends to hold the amplifier input voltage at zero, this charging current will be substantially proportional to the signal on the input terminal. Consequently, with a steady input signal, the voltage of the amplifier output terminal 30 will change at a substantially constant rate proportional to the magnitude of the input signal. On the other hand, if the hold relay 122 is deenergized, the output voltage will be held constant, essentially without drift.

The output of amplifier 114 also is connectable through a resistor 124 (100K) and contacts 126 of a "set" relay 128 to the input point 113. When the set relay is actuated to complete this circuit, the charge on the capacitor 116 may be adjusted by a voltage-dividing potentiometer 130 which is bridged between the positive and negative supply lines and the movable tap of which is connected to one relay contact through a resistor 132 (100K). The knob 38 (FIGURE 1) on the top of the unit 12 (or 14) permits the student to adjust this potentiometer as desired, and thereby set the "initial condition" of the integrator units in accordance with the requirements of the mathematical problem being solved.

FIGURE 5 also shows diagrammatically the four connectors which form part of the integrator units, two of the connectors being male and two female. The female connector 88 of the control unit 20 is engaged with the male connector at the back of the integrator unit. All of the four connectors of the integrator are wired together within the integrator chassis, so that the corresponding elements of these connectors have identical potentials at all times. It also will be evident that the hold relay 122 will be actuated whenever the element 98 of connector 88 is energized by operation of hold switch 94 in control unit 20, as discussed above with reference to FIGURE 4, the energizing circuit being completed through the minus 7-volt power bus which is connected to battery 75 in the control unit. Similarly, set relay 128 will be actuated when element 112 of connector 88 is energized in the control unit by operation of set switch 108, the energizing current being supplied by battery 75 through the minus 7-volt power bus.

Figure 6:
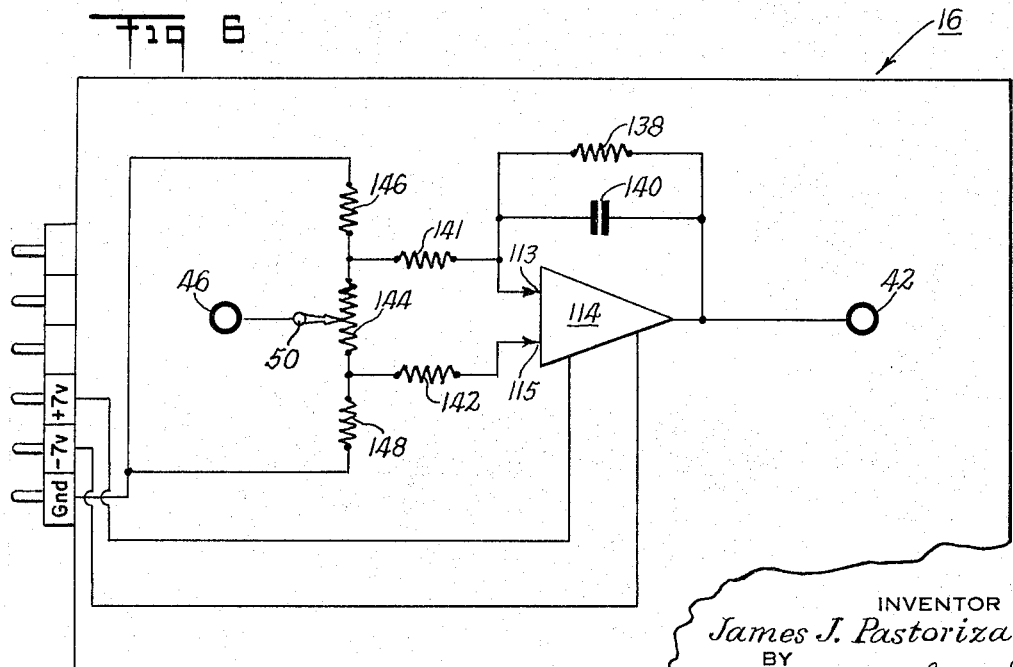

Referring now to FIGURE 6, the coefficient multiplier unit 16 (or 18) comprises a differential amplifier 114 (identical to the amplifier in units 12 and 14) having a stabilizing negative feedback circuit including a resistor 138 (11 megohms) in parallel with a capacitor 140 (.0001 microfarad). The two input points 113 and 115 of this amplifier are connected through respective resistors 141 and 142 (1 megohm and 100K ohms respectively) to corresponding end terminals of a potentiometer 144 (1 megohm). The potentiometer terminals are in turn grounded through respective resistors 146 and 148 (110K ohms and 100K ohms), and the movable tap of the potentiometer is connected to the input terminal 46 of the multiplier unit. A knob 50 is provided at the top of the mutliplier unit to permit the student to adjust the potentiometer, so as to control both the overall gain of the unit and the polarity (i.e., whether positive or negative) of the output signal.

Thus the units 16 and 18 are adapted to perform the operation of multiplying a variable by a manually-adjustable constant and thereby simulate the effect of a constant coefficient, such as damping factor, in a mathematical equation. In the embodiment disclosed herein, the coefficient (gain) can be set accurately within a range of plus or minus 10. When the knob 50 is in its center position, i.e., straight up and down, the effective gain of the unit is zero, thus reflecting a coefficient of zero. On either side of center, the knob position is non-linearly related to gain to permit low-gain settings to be made with high accuracy; specifically, the circuit is so arranged that the coefficient of the multiplier is plus 1 when the knob is rotated 90° clockwise, and minus 1 when the knob is rotated 90° counterclockwise.

The adder unit 10 shown in FIGURE 7 comprises a high-gain differential amplifier 114 (identical to the amplifier in the other teaching units) provided with a stabilizing negative feedback circuit including a resistor 154 (100K ohms) in parallel with a capacitor 156 (100 PF). The upper input point 113 of this amplifier is connected through respective isolating resistors 158a–158e (100K ohms) to the input terminals 24a–24e, and also is connected through another isolating resistor 160 (100K ohms) to the movable tap of a potentiometer 162 connected across the positive and negative supply lines. The lower input point 115 is grounded. The amplifier circuitry is so arranged that the adder unit has a gain of 1 between any of the input terminals and the output terminal 26.

The adder unit 10 thus performs the function of adding up to six variables, each represented by a voltage signal. Five of these voltages are applied to corresponding input terminals 24a–24e, while the sixth is generated internally and can be adjusted both as to magnitude and sign by the top panel knob 28 which operates potentiometer 162. The isolation resistors in the input circuit assure that there is substantially no interaction between the input circuit assure that there is substantially no interaction between the input signals, so that the amplifier output signal accurately reflects the summation of the individual input signals. A typical application of the adder unit is to sum all of the terms of a differential equation, as outlined briefly hereinabove.

The coefficient multiplier units 18 and 20 and the adder unit 10 are, like the integrator units 12 and 14, provided with four connectors the corresponding elements of which are wired together within the chassis of the respective unit. To simplify the presentation herein, only one of these connectors is shown in FIGURES 6 and 7, it being understood that the other three connectors for each unit are as shown in FIGURE 5.

Referring now to FIGURE 8, which shows details of the differential amplifier used in the teaching units described hereinabove, the input signal on terminals 113 and 115 is directed through a resistor 164 to a voltage-sensing bridge network 166. This bridge includes a tuned circuit consisting of a transformer winding 168 across which is connected a potentiometer 170 as well as a capacitor 172 in series with a voltage-controlled capacity diode 174. The operation of such diodes is well known (see, for example, Olsen Patent No. 2,956,234), and it will only be noted here that when the voltage applied to the diode is within the predetermined operating range, the conductance of the diode is extremely small and its capacitance is a function of the applied voltage. Thus it will be apparent that the balance of the resonant tuned bridge network 166 is controlled by the D.-C. signal applied to terminals 113 and 115, and that there will be effectively no current drawn from the signal source. Moreover, with such a low current drawn from the signal source, the power dissipation in diode 174 is negligible, so that there are essentially no drift effects due to rise in the temperature of the diode resulting from self-heating.

The voltage-sensing network 166 is coupled, in a balanced symmetrical configuration, through capacitors 176 and 178 to the input circuit of a transistor oscillator 180 which includes another tuned circuit comprising the other transformer winding 182 in parallel with a capacitor 184. The transformer coupling forms a feedback path to induce oscillations of about 1 megacycle, and the step-down voltage ratio from winding 182 to winding 168 is about 20:1. An A.-C. path for the oscillator input signals is provided by a capacitor 186 connected between the transistor emitter and the tap of potentiometer 170. Energizing current for the oscillator is supplied from the positive voltage bus 188 (plus 7 volts) through a resistor 190 connected to the transistor emitter, the circuit being completed through the winding 182 to the negative voltage bus 192 (minus 7 volts). Bias for the transistor base is provided by voltage-dividing resistors 194 and 196 connected between lines 188 and 192.

Accordingly, with this arrangement, the balance of the voltage-sensing bridge network 166 is controlled by the D.-C. signal applied to input terminals 113 and 115, and the bridge network, in turn, controls the drive of the oscillator 180. If the bridge were perfectly balanced, i.e., if the capacitance of diode 174 equalled the capacitance of capacitor 172, there will be no feedback and hence no oscillations. However, the diode capacitance is made unequal to capacitor 170, within the normal range of the D.-C. input signal, and a small unbalance voltage is fed through capacitor 176 in the correct phase to induce oscillations by positive feedback. As the input signal is varied through its full range (e.g., plus or minus about 5 millivolts), the amplitude of oscillations across winding 182 will vary from minimum to maximum. Since the transistor 180 provides A.-C. amplification, there will be effectively no drift effects due to normal changes in transistor gain, etc.

The output oscillations appearing on transformer winding 182 are coupled through a capacitor 198 to a transistor amplifier 200, the base of which also is connected through a variable resistor 202 and a fixed resistor 204 to the positive supply bus 188. The emitter of this transistor is connected directly to the positive bus, and the collector is connected through a load resistor 206 to the negative bus 192 and to the amplifier output terminal 208. An RC filter network 210 is connected between output terminal 208 and the negative bus to smooth out unwanted fluctuations in the output signal.

The output voltage on terminal 208 is determined by the average current flowing through the transistor 200, and this current in turn is determined by the amplitude of oscillations developed in the transistor oscillator 180. In effect, the circuit of transistor 200 provides both detection and amplification of the A.-C. signal from oscillator 180, thus combining these two functions in a single circuit. As the amplifier D.-C. input signal varies through its full range (e.g., about plus or minus 5 millivolts), the output voltage on terminal 208 will correspondingly vary through its full range of about minus 5 volts to about plus 5 volts. Thus the amplifier has an effective overall gain of about 1000, thereby providing ample linearity and drift-free opeartion when used with stabilizing negative feedback circuits as described above with reference to FIGURES 5, 6 and 7.

It has been found that the inclusion of resistor 202 in the circuit provides a considerable increase in gain. This effect may be due to an increase in Q of the tuned circuit of winding 182 and capacitor 184, in that resistor 202 significantly decreases the load on this tuned circuit. In any event, an optimum value for resistor 202 can be determined, and for that reason this resistor advantageously is variable to permit any necessary adjustment during production.

In the preferred embodiment of the invention, the values of the amplifier circuit elements were as follows:

| | |
|---|---|
| Diode 174 | Type 1N47 |
| Transistor 180 | 2N1499A |
| Transistor 200 | 2N404 |

Resistors, No.:

| | |
|---|---|
| 164 | 33K |
| 170 | 500 |
| 190 | 2.7K |
| 194 | 22K |
| 196 | 22K |
| 202 | 10K |
| 204 | 10K |
| 206 | 15K |

Capacitors, No.:

| | |
|---|---|
| 172 | 100 PF |
| 176, microfarads | .001 |
| 178, microfarads | .005 |
| 184 | 100 PF |
| 186, microfarads | .02 |
| 198, microfarads | .005 |

Although a particular embodiment of the invention has been described in detail in this specification, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Teaching apparatus comprising a plurality of operating units in the form of separate boxes each containing a high-gain amplifier having negative feedback means; each of said boxes being provided at the sides thereof with plug and receptacle connector means comprising a male connector and a female connector rigidly secured to respective sides of the box and having multiple conductor elements; one connector of each operating unit being engaged with a corresponding connector of another operating unit to connect all of the units together electrically as well as physically; circuit means connecting corresponding elements of the male and female connectors of each unit together within the respective unit to provide parallel circuits, thereby permitting the units to be assembled in different physical configurations as desired while still maintaining electrical continuity between the connectors of the various units; a control unit separate from said operating units, a power supply circuit in said control unit for activating the amplifiers in all of said operating units, cable means extending from said control unit to one of said operating units, means including said cable means connecting said control unit power supply circuit to predetermined elements of the connectors at said one operating unit, thereby to supply power in common to all of the corresponding connector elements of the interconnected operating units; means within each of said operating units connecting the power terminals of the respective amplifier to said corresponding connector elements to supply power to all of the amplifiers from said control unit; leads interconnecting the inputs and outputs of the amplifiers of said operating units to form a complete simulated system; and meter means connected to one point of said system to provide a visual demonstration of dynamic system effects.

2. Teaching apparatus comprising a plurality of operating units in the form of separate boxes each containing a high-gain amplifier having negative feedback means; each of said boxes being provided with connector means comprising a male connector and a female connector, one connector of each operating unit being engaged with a corresponding connector of another operating unit to connect the various units together; circuit means connecting corresponding elements of the male and female connectors of each unit together within the respective unit to provide a parallel circuit arrangement permitting the units to be assembled in different physical configurations as desired while still obtaining electrical continuity between the units through said connectors; a capacitor connected to the amplifier in one of said operating units and arranged to produce an integrating action in the amplifier output; a relay in said one unit, switch means forming part of said relay and arranged when actuated to stop the integrating action in the amplifier output and to hold the charge on said capacitor unchanged; a control unit physically separate from said operating unit boxes, manually-operable electrical control means at said control unit; cable means extending from said control unit to a particular operating unit; means including said cable means connecting said manually-operable control means to predetermined elements of the connectors at said particular unit, thereby to connect said manually-operable control means in common to all of the corresponding predetermined connector elements of the interconnected operating units; means within said one operating unit connecting said relay to said predetermined connector elements to permit remote actuation of said relay by said manually-operable control means at said control unit; leads interconnecting the inputs and outputs of the amplifiers of said operating units to form a complete simulated system; and meter means connected to one point of said system to provide a visual demonstration of dynamic system effects.

3. Teaching apparatus comprising a plurality of operating units in the form of separate boxes each containing a high-gain amplifier having negative feedback means; each of said boxes being provided with connector means comprising a male connector and a female connector, one connector of each operating unit being engaged with a corresponding connector of another operating unit to connect the various units together; circuit means connecting corresponding elements of the male and female connectors of each unit together within the respective unit to provide a parallel circuit arrangement permitting the units to be assembled in different physical configurations as desired while still obtaining electrical continuity between the units through said connectors; a capacitor connected to the amplifier in one of said operating units and arranged to produce an integrating action in the amplifier output; a relay in said one unit; a manually-adjustable set signal circuit within said one unit to produce a D.-C. voltage of adjustable magnitude; switch means forming part of said relay and arranged when said relay is actuated to couple the set signal produced by said set signal circuit to said capacitor to fix the charge on said capacitor so as to permit establishment of a desired initial condition of the integrating action to be produced when the relay subsequently is deactuated; a control unit physically separate from said operating unit boxes, manually-operable electrical control means at said control unit; cable means extending from said control unit to a particular operating unit; means including said cable means connecting said manually-operable control means to predetermined elements of the connectors at said particular unit, thereby to connect said manually-operable control means in common to all of the corresponding predetermined connector elements of the interconnected operating units; means within said one operating unit connecting said relay to said predetermined connector elements to permit actuation of said relay by said manually-operable control means at said control unit; leads interconnecting the inputs and outputs of the amplifiers of said operating units to form a complete simulated system; and meter means connected to one point of said system to provide a visual demonstration of dynamic system effects.

4. Teaching apparatus comprising a plurality of operating units in the form of separate boxes each containing a high-gain amplifier having negative feedback means; each of said boxes being provided with respective connector means having multiple elements; a connector of each operating unit being engaged with a corresponding connector of another operating unit to connect the various units together electrically for joint operation in simulating various physical systems; a capacitor connected in the amplifier circuit in one of said operating units and arranged to produce an integrating action in the amplifier output such that the amplifier output signal represents the time-integral of the amplifier input signal at that operating unit; a relay in said one unit, switch means forming part of said relay and arranged when said relay is actuated to stop the integrating action in the amplifier output so that the charge on said capacitor does not vary as a function of time; a control unit physically separate from said operating unit boxes; manually-operable electrical control means at said control unit; cable means extending from said control unit to a particular operating unit; circuit means including said cable means connecting said manually-operable control means to predetermined elements of the connector means at said one operating unit, circuit means within said one operating unit connecting the power terminals of said relay to said predetermined connector elements to permit remote actuation of said relay by said manually-operable control means at said control unit; leads interconnecting the inputs and outputs of the amplifiers of said operating units to form a complete simulated system; and meter means connected to one point of said system to provide a visual demonstration of dynamic system effects.

5. Teaching apparatus comprising a plurality of operating units in the form of separate boxes each containing a high-gain amplifier having negative feedback means; each of said boxes being provided with respective connector means including a plurality of individual connector elements; a connector of each operating unit being engaged with a connector of another operating unit to connect the various units together electrically; a capacitor connected as part of the amplifier circuit in one of said operating units and arranged to produce an integrating action in the amplifier output such that the amplifier output signal represents the time-integral of the amplifier input signal at that operating unit; a relay in said one unit; a set signal circuit within said one unit to produce a D.-C. voltage of adjustable magnitude; a manually-operable adjustment device at said one unit and connected to said set signal circuit to permit alteration of the magnitude of said D.-C. voltage; switch means forming part of said relay and arranged when said relay is actuated to couple the D.-C. voltage produced by said set signal circuit to said capacitor to fix the charge on said capacitor so as to permit establishment of desired initial condition of the integrating action to be produced when the relay subsequently is deactuated; a control unit physically separate from said operating unit boxes, manually-operable electrical control means at said control unit; cable means extending from said control unit to a particular operating unit; circuit means including said cable means connecting said manually-operable control means to predetermined elements of the connector means at said one unit; means within said one operating unit connecting the power input terminals of said relay to said predetermined connector elements to permit actuation of said relay by said manually-operable control means at said control unit; leads interconnecting the inputs and outputs of the amplifiers of said operating units to form a complete simulated system; and meter means connected to one point of said system to provide a visual demonstration of dynamic system effects.

References Cited by the Examiner

UNITED STATES PATENTS

| | | | |
|---|---|---|---|
| 2,844,311 | 7/1958 | Baum | 235—184 |
| 2,965,977 | 12/1960 | Crabb | 235—184 |
| 3,147,446 | 9/1964 | Wittenberg | 330—9 |
| 3,153,202 | 10/1964 | Woolam | 330—9 |

OTHER REFERENCES

Donner Model 3000 Analog Computer: "Building Block Simplicity," Donner Scientific Co., 1957. (Copy in Group 240.)

Catalog and Manual on GAP/R Analog Computer: Geo. A. Philbrick Researches, Inc., 1951 (copy Group 240) (pp. 4–12 relied on).

MALCOLM A. MORRISON, *Primary Examiner.*

A. J. SARLI, *Assistant Examiner.*